US011601781B2

United States Patent
Vernon et al.

(10) Patent No.: US 11,601,781 B2
(45) Date of Patent: Mar. 7, 2023

(54) INSPECTION TRACKING SYSTEM

(71) Applicants: Daniel George Vernon, Ashland, WI (US); Brian Carl Gustafson, Roosevelt, MN (US); Matthew Todd Freudenrich, Fort Ripley, MN (US)

(72) Inventors: Daniel George Vernon, Ashland, WI (US); Brian Carl Gustafson, Roosevelt, MN (US); Matthew Todd Freudenrich, Fort Ripley, MN (US)

(73) Assignee: Northern Clearing, Inc., Ashland, WI (US)

( * ) Notice: Subject to any disclaimer, the term of this patent is extended or adjusted under 35 U.S.C. 154(b) by 219 days.

(21) Appl. No.: 17/122,044

(22) Filed: Dec. 15, 2020

(65) Prior Publication Data

US 2021/0185483 A1 Jun. 17, 2021

Related U.S. Application Data

(60) Provisional application No. 62/948,668, filed on Dec. 16, 2019.

(51) Int. Cl.
*H04W 4/029* (2018.01)
*G08B 21/18* (2006.01)
(Continued)

(52) U.S. Cl.
CPC ............ *H04W 4/029* (2018.02); *B60R 16/02* (2013.01); *G01S 5/0294* (2013.01); *G01S 5/08* (2013.01); *G01S 5/14* (2013.01); *G08B 21/18* (2013.01)

(58) Field of Classification Search
CPC ...... H04W 4/029; B60R 16/02; G01S 5/0294; G01S 5/08; G01S 5/14; G08B 21/18
(Continued)

(56) References Cited

U.S. PATENT DOCUMENTS 7,880,599 B2   2/2011  Murray et al.
8,795,439 B2   8/2014  Vernon et al.
(Continued)

FOREIGN PATENT DOCUMENTS

WO    WO 2018/053309 A1    3/2018

OTHER PUBLICATIONS

Omnitracs XRS; Simplicity, Affordability and Mobility—The XRS Difference; 2016; 4 pages; https://www.omnitracs.com/sites/default/files/2019-01/XRS_Platform_Overview_11-17_web.pdf.
(Continued)

*Primary Examiner* — Kerri L McNally
(74) *Attorney, Agent, or Firm* — Reinhart Boerner Van Deuren P.C.

(57) ABSTRACT

A system and method to verify that the driver or operator of a vehicle or piece of equipment has completed a 360-degree walk-around inspection of the vehicle/equipment. The vehicle/equipment will be equipped with an electronic beacon that detects the direction of the driver/operator via a mobile electronic device that the driver/operator carries. As the operator walks around the vehicle/equipment, the electronic beacon installed on the vehicle/equipment recognizes the location of the mobile electronic device as the driver/operator walks around the vehicle/equipment performing their inspection. In certain embodiments, the electronic beacon and mobile electronic device determine the operator's inspection are Angle of Arrival and Angle of Departure relative to each electronic beacon. The determination may require different combinations of transmitters and receivers. In another embodiment, multiple antennas, mounted on the vehicle/equipment and/or mobile electronic device, provide the location details of the driver/operator in correlation to the vehicle/equipment.

20 Claims, 4 Drawing Sheets

(51) Int. Cl.
*B60R 16/02* (2006.01)
*G01S 5/14* (2006.01)
*G01S 5/08* (2006.01)
*G01S 5/02* (2010.01)

(58) Field of Classification Search
USPC .................................................. 340/539.13
See application file for complete search history.

(56) References Cited

U.S. PATENT DOCUMENTS

| | | | |
|---|---|---|---|
| 9,002,571 | B1 | 4/2015 | Gribble et al. |
| 9,392,404 | B2 | 7/2016 | Daoura et al. |
| 9,780,967 | B2 | 10/2017 | Sargent et al. |
| 10,118,299 | B1 | 11/2018 | Hudson et al. |
| 2003/0117298 | A1 | 6/2003 | Tokunaga et al. |
| 2013/0176124 | A1 | 7/2013 | Brinton et al. |
| 2013/0186962 | A1 | 7/2013 | Kennett et al. |
| 2013/0211623 | A1 | 8/2013 | Thompson et al. |
| 2014/0067189 | A1* | 3/2014 | Smith .................... G08G 1/166 701/29.1 |
| 2014/0357295 | A1 | 12/2014 | Skomra et al. |
| 2016/0185222 | A1 | 6/2016 | Ricci et al. |
| 2016/0300406 | A1* | 10/2016 | Bora Hamamcioglu ................... G07C 5/08 |
| 2016/0307375 | A1* | 10/2016 | Toutant .................. G07C 5/085 |
| 2017/0249635 | A1* | 8/2017 | Baur .................. G06Q 20/3278 |
| 2017/0337573 | A1* | 11/2017 | Toprak ............... G06Q 30/0278 |
| 2018/0365771 | A1 | 12/2018 | Kilburn |

OTHER PUBLICATIONS

Omnitracs; Installing the Omnitracs XRS Relay; 1 page; https://www.traxxisgps.com/images/xrs/rts/installation/XRS%20Relay%20Installation%20Guide.pdf.

Omnitracs; Hours of Service—System Administrator's Guide; Sep. 2015; 74 pages; https://www.customer.omnitracs.com/training/docs/hos/doc_cust_qhos_sys-adm_d.pdf.

Omnitracs; Critical Event Reporting; 2015; 2 pages; https://www.omnitracs.com/sites/default/files/brochure_safety_critical-event-reporting.pdf.

Omnitracs; Analytics Manager; 2013; 4 pages; http://www.omnitracs.com/rs/omnitracsllc1/images/LCL1129_11-13_AnalyticsManager_Brochure.pdf.

Omnitracs; Omnitracs XRS Driver Guide; Jul. 2016, 39 pages; https://irp-cdn.multiscreensite.com/ed462705/files/uploaded/XRS_Driver-GUide.pdf.

* cited by examiner

INSPECTION TRACKING SYSTEM

CROSS-REFERENCE TO RELATED PATENT APPLICATIONS

This patent application claims the benefit of U.S. Provisional Patent Application No. 62/948,668 filed Dec. 16, 2019, the entire teachings and disclosure of which are incorporated herein by reference thereto.

FIELD OF THE INVENTION

This invention generally relates to an inspection tracking system for large machines, vehicles, and industrial or construction equipment.

BACKGROUND OF THE INVENTION

There are often required inspections for certain types of equipment, such as large trucks, construction vehicles and related equipment. Documentation of these inspections may also be required.

Ensuring vehicle safety prior to operating is critical for all companies to prevent property damage, injury, or in some cases death. Many companies today require operators of vehicles and equipment to perform both pre-operational inspections as well as periodic inspections throughout the day. There are various methods available today for companies to record these inspections, both electronic and paper recording.

Embodiments of the present invention provide a system and method for conducting the aforementioned inspections. These and other advantages of the invention, as well as additional inventive features, will be apparent from the description of the invention provided herein.

BRIEF SUMMARY OF THE INVENTION

Embodiments of the present invention include a system and method to electronically verify that the operator of a vehicle or piece of equipment has completed a 360-degree walk-around inspection of the vehicle/equipment. The vehicle or equipment will be equipped with electronic device(s) that detect the location of the operator via a smart device that the operator carries. As the operator walks around the vehicle/equipment, the electronic device(s) installed in the vehicle/equipment will recognize the location of the smart device in the operator's possession the entire time he/she walks around the vehicle/equipment performing their inspection.

In one particular embodiment, the electronic devices will be electronic beacons, for example Bluetooth beacons, installed in or near the headlights and taillights of the vehicle. They will be wired directly into the vehicle's OEM wiring to power the Bluetooth beacons. In particular embodiments, received signal strength indication (RSSI) or signal levels will be recorded at four locations on the vehicle during installation to establish a baseline RSSI. Once the user begins the 360-degree walk-around inspection, a mobile application stored on the operator's mobile electronic device will determine the operator's location based on the RSSI levels of all four electronic or Bluetooth beacons.

The Bluetooth beacon may include a Bluetooth module that is installed in a plastic mold with the module's wire leads projecting from the beacon. Then the module will be potted in place ensuring moisture cannot damage the unit. Users will simply remove the respective headlight/taillight and install the beacon using a quick connector to the vehicles existing OEM wiring.

In a further embodiment, the electronics devices will again be electronic beacons or Bluetooth beacons which are battery operated and can be attached on the vehicle/equipment in any location the user chooses so long as it is in the "four most corners" of the vehicle. Methods for attaching the beacons will include adhesive pads or hardware (screws/bolts). Similar to the hardwired beacons mentioned previously, RSSI (or signal levels) will be recorded at all four locations of the vehicle during installation to establish a baseline RSSI. Once the user begins the 360-degree walk-around inspection, the mobile applications will determine the location based on the RSSI levels of all four electronic or Bluetooth beacons.

The electronic device and battery may be installed in a plastic mold. Then, the module can be potted in place ensuring that moisture will not damage the beacon.

Other embodiments of the present invention include the use of a fixed antenna array attached to a centralized location of the vehicle or piece of equipment. The antenna array will then triangulate the location of the mobile device. Particular embodiments of the invention include technologies for determining Angle of Arrival (AoA) or Angle of Departure (AoD) of the inspector.

The mobile application may include an inspection checklist customized to the type of vehicle in use for user convenience. This inspection checklist may be automatically loaded when the vehicle or equipment be inspected is selected in the mobile application. The mobile application may provide automatic prompts for the information to be filled in by the operator. In some embodiments, the inspection will not be considered complete until the operator has done a complete walk around of the vehicle/equipment and completed the inspection checklist.

Results of the completed inspection(s) can be saved in a vehicle/equipment inspection database that is searchable via the mobile application and available for review by the system user. In certain embodiments of the invention, if the driver/operator 104 fails to complete the inspection, the system will automatically issue an alert to notify their supervisor.

In one aspect, embodiments of the invention provide a vehicle and equipment inspection system for a machine that includes one or more electronic apparatus, each attached to the vehicle or equipment, and each electronic apparatus adapted for wireless communication. A mobile electronic device is adapted for wireless communication with the electronic apparatus. The mobile electronic device includes a mobile application configured to determine a location of the mobile electronic device relative to each of the one or more electronic apparatus.

In a particular embodiment, the mobile electronic device is one of a smart phone, smart watch, tablet computer, and a laptop computer. The electronic apparatus may be configured to communicate wirelessly using one of the Bluetooth, LTE, RF, Z-Wave, Wi-Fi, and Zigbee communication protocols. Furthermore, in some embodiments, the one or more electronic apparatus are each configured to detect movement of the mobile electronic device in a 360-degree-space surrounding the vehicle or equipment. In other embodiments, the one or more electronic apparatus and mobile application are configured to determine an angle of arrival or angle of departure for a user carrying the mobile electronic device.

In certain embodiments, the mobile application is configured to determine if the user inspected the vehicle or equipment based on the determined angle of arrival or angle of departure. In a further embodiment, the electronic apparatus includes one or more antennas used to determine a location of the user, while in alternate embodiments, the mobile electronic device includes one or more antennas used to determine a location of the user. The mobile electronic device and mobile application may be configured to record and store data showing the location of the mobile electronic device relative to each of the one or more electronic apparatus.

In particular embodiments, the mobile electronic device and mobile application are configured to determine the relative RSSI levels of the one or more electronic apparatus in order to determine a location of the mobile electronic device. The electronic apparatus may be hardwired to the power supply of the vehicle or equipment, or it may be battery-powered. In some embodiments, the electronic apparatus includes a QR code or a unique identification number (UUID) to identify the electronic apparatus in the mobile application As the operator walks around the vehicle/equipment, the electronic device that is installed in the vehicle/equipment will recognize the location of the smart device in the driver/operator's possession the entire time he/she walks around the vehicle/equipment performing their inspection.

Some of the technologies we intend to use to verify operator inspection are Angle of Arrival (AoA) and Angle of Departure (AoD) that could consist of different combinations of transmitters and receivers. In another embodiment, multiple antennas are included in the vehicle-mounted electronic beacons and/or mobile electronic device to provide the location details of the driver/operator or system user in correlation to the vehicle/equipment.

In another aspect, the invention provides a method of vehicle or equipment inspection that includes the steps of installing one or more electronic beacons on a vehicle or piece of equipment, providing a mobile electronic device with a mobile application configured for wireless communication with each of the one or more electronic beacons, and using the mobile application to select the vehicle or piece of equipment to be inspected. The method further includes the steps of wirelessly communicating with the one or more electronic beacons associated with the vehicle or piece of equipment, and determining an RSSI level for each of the one or more electronic beacons, and then determining a location of a user carrying the mobile electronic device based on the determined RSSI levels.

In a particular embodiment, the method also includes using the one or more electronic beacons to detect movement of the mobile electronic device in a 360-degree-space surrounding the vehicle or equipment. In another embodiment the method includes providing one of a smart phone, smart watch, tablet computer, and a laptop computer. Embodiments of the method may also require using the one or more electronic beacons and the mobile application to determine an angle of arrival or angle of departure for a user carrying the mobile electronic device.

In certain embodiments, the method includes using the mobile application to store, on the mobile electronic device, location data for the mobile electronic device relative to each of the one or more electronic beacons. In some embodiments, the method calls for scanning a QR code on one of the one or more electronic beacons to identify that electronic beacon in the mobile application, while in other embodiments, the method requires entering a unique identification number or string on one of the one or more electronic beacons to identify that electronic beacon in the mobile application. The method may further include determining an RSSI level for each of the one or more electronic beacons comprises a user carrying the mobile electronic device to approach each of the one or more beacons to obtain a maximum RSSI level for each of the one or more electronic beacons.

In a further embodiment of the invention, the electronic apparatus stores the data generated by each inspection and automatically generates an electronic record or printed documentary record of the inspection.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
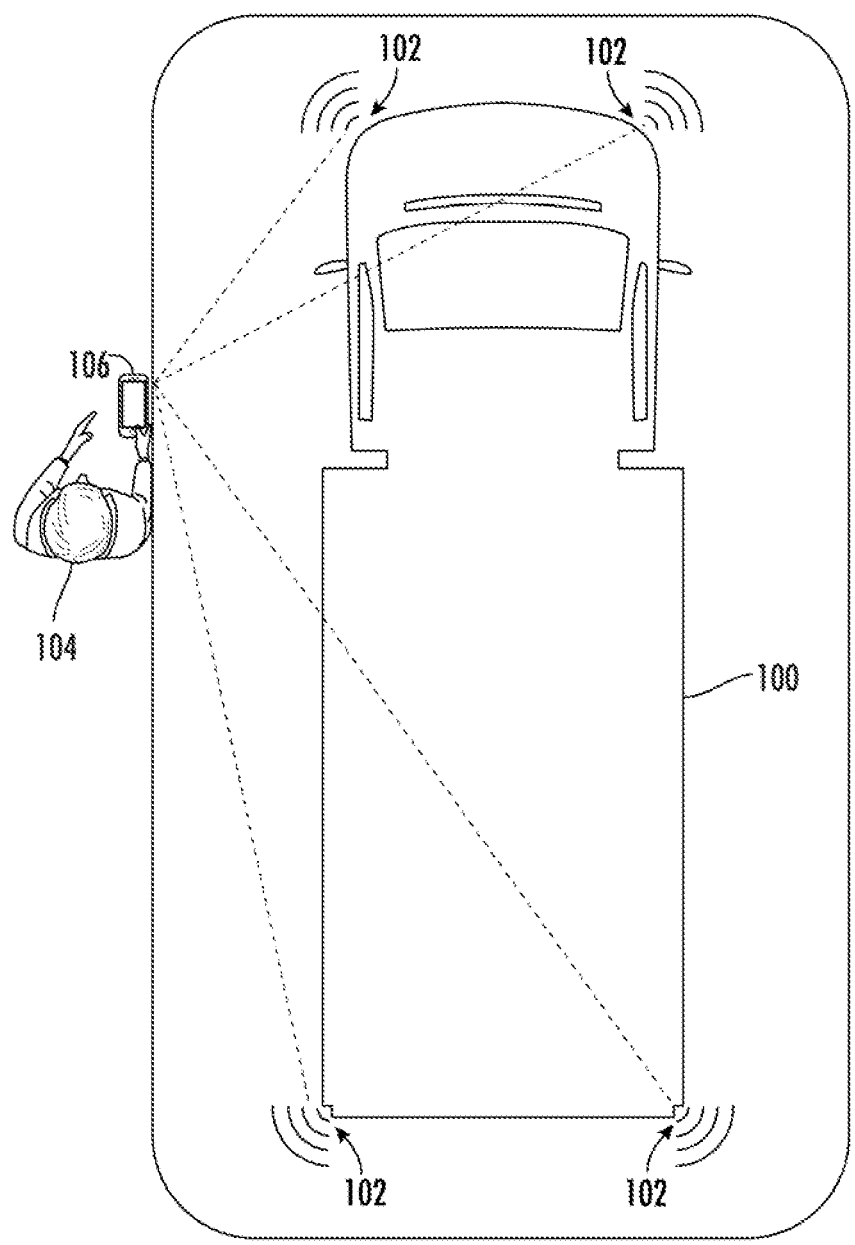
FIG. 1 is a schematic view of a vehicle/equipment inspection tracking system for machines, according to an embodiment of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As vehicle operators commute throughout a given day, they enter and exit their vehicles, or approach their equipment many times. The owners/managers of these vehicles or equipment often ask operators to "walk around" their vehicle/equipment prior to moving it. This allows the operator to verify that no people or property are located in the vehicle's blind spots prior to moving the vehicle. Using conventional systems, there is no reliable, effective, and economical way for companies to verify employees are performing this brief walk around today. Many owners/managers are using ineffective methods in an attempt to accomplish this by posting signage on vehicles or requiring operators to place cones out behind their vehicle every time they stop requiring the operator to pick it up prior to moving. Embodiments of the present invention allow companies to verify this brief, yet critical, inspection step is completed and not skipped.

Described herein is a vehicle/equipment inspection system and method of using same to verify that the driver or operator of a vehicle or piece of equipment (typically heavy equipment) has completed a thorough, 360-degree walk-around inspection of the vehicle or piece of heavy equipment. In the embodiment shown in FIG. 1, the vehicle/equipment inspection system includes a vehicle 100 is equipped with an electronic apparatus 102 that detects the direction of the vehicle driver/equipment operator 104 via a mobile electronic device 106 that the system user or driver/operator 104 carries.

In a particular embodiment of the invention, the electronic apparatus 102 is an electronic beacon or Bluetooth beacon which is installed in the headlights and taillights of the vehicle 100. While the electronic apparatus 102 is referred to herein as a Bluetooth beacon 102 for the sake of convenience, it should be recognized that the electronic apparatus 102 may communicate wirelessly using other communications protocols including, but not limited to LTE, RF, Z-Wave, Wi-Fi, and Zigbee. The electronic apparatus 102 may be wired directly into the vehicle's OEM wiring to provide power to the Bluetooth beacons 102.

While FIG. 1 and other embodiments shown in this application disclose a vehicle 100, those of ordinary skill in the art will recognize that heavy equipment, for example construction equipment, may also be equipped with the electronic apparatus 102. Thus, in each instance herein where a vehicle 100 is disclosed, the scope of the invention includes a similar application in which a piece of heavy equipment (e.g., construction equipment, industrial equipment) is substituted for the vehicle 100.

In particular embodiments, the received signal strength indication (RSSI) or signal levels output by the Bluetooth beacons 102 will be recorded at each location (e.g., four locations as described above) on the vehicle 100 having a beacon 102 during installation to establish a baseline RSSI. In alternate embodiments, the vehicle or heavy equipment 100 may have fewer or greater than four Bluetooth beacons 102 depending on the size and/or design of the vehicle or heavy equipment 100. Once the system user or driver/operator 104 begins the 360-degree walk-around vehicle/equipment inspection, the mobile application will determine the location of the driver/operator 104 and mobile electronic device 106 relative to the installed Bluetooth beacons 102 based on the RSSI levels of all installed Bluetooth beacons 102.

On a vehicle/equipment 100 with a square or rectangular footprint, it may be advantageous to locate the Bluetooth beacons 102 at least on the four corners of the vehicle 100. Methods for attaching the beacons 102 include the use of adhesive pads and mechanical fasteners (e.g., screws, bolts, etc.). As explained above, RSSI (or signal levels) will be recorded at up to four or more locations of the vehicle/equipment 100 during installation to establish a baseline RSSI. Once the system user or driver/operator 104 begins the 360-degree inspection, the mobile application will determine the relative location of the driver/operator 104 based on the RSSI levels of all the Bluetooth beacons 102.

Figure 2:
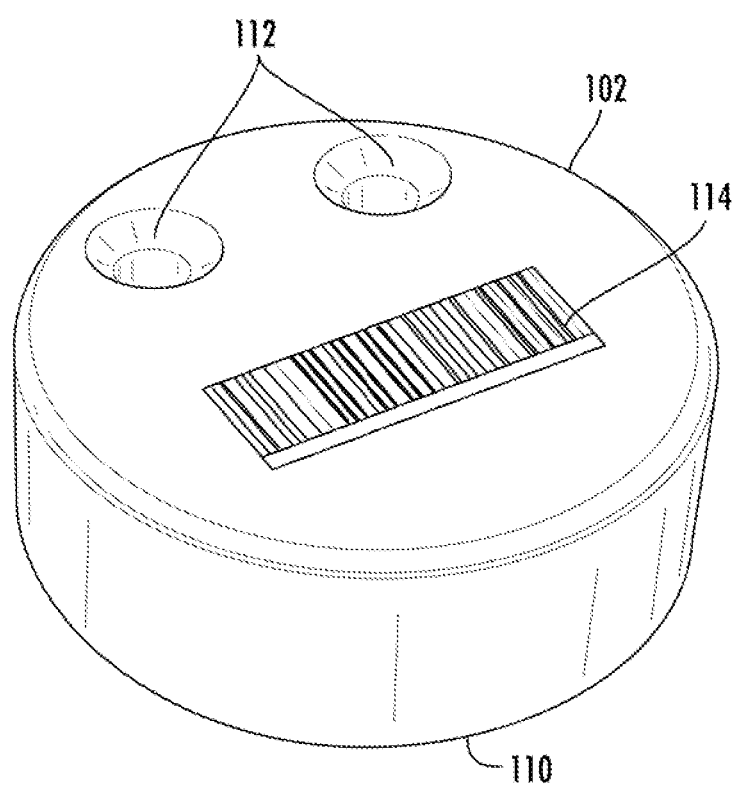
FIG. 2 is a perspective view of a beacon in accordance with an embodiment of the invention.

In particular embodiments such as that shown in FIG. 2, the Bluetooth beacon 102 includes a Bluetooth module that is installed in a plastic mold with the wire leads (not shown) of the Bluetooth module projecting from the Bluetooth beacon 102. In more particular embodiments, the Bluetooth module is then potted in place ensuring moisture cannot damage the beacon 102. The driver/operator 104 may then simply remove the respective headlight/taillight and install the beacon 102, using a quick connector, to the existing OEM wiring of the vehicle or heavy equipment 100. In a further embodiment, the electronic apparatus 102 or Bluetooth beacon 102 is battery operated and can be attached on the vehicle/equipment 100 in any location the driver/operator 104 chooses.

In certain embodiments of the invention, the beacon 102 and battery are disposed within a housing 110 of the beacon 102. Additionally, the housing 110 may be hermetically sealed. In particular embodiments and as indicated above, the beacon 102 may include a potting compound within the housing and surrounding at least some portion of the electronic circuitry in order to make the beacon 102 water-proof and dust-proof, resistant to extreme temperature, as well as resistant to vibration and physical shocks.

In certain more embodiments such as shown in FIG. 2, the housing 110 is cylindrical. Further embodiments include those where the housing 110 is less than three inches in diameter, though in other embodiments, the housing 110 is less than two inches in diameter. The height of the housing 110 is less than two inches in some embodiments, and less than one inch in other embodiments.

Embodiments of the beacon 102 include those with a housing 110 having two openings 112 to accommodate mechanical fasteners. In some embodiments, the beacon 102 includes an adhesive tag 114 with a QR code attached to the housing 110. The tag 114 may also include a unique identification number for the beacon 102 which can be entered into a memory of the mobile application by the driver/operator 104 or other user. The housing 110 may be made from plastic though other similarly suitable materials are also envisioned.

The following is an exemplary process for the set up and installation of the vehicle/equipment inspection system. After installation of the Bluetooth beacons 102 in the headlights and tail lights of the vehicle 100, or on various portions of the heavy equipment 100, as described above, the system user or driver/operator 104 accesses the above-referenced software-based mobile application on the mobile electronic device 106. In this mobile application, the system user or driver/operator 104 identifies the vehicle 100 or heavy equipment 100 and then assigns one or more Bluetooth beacons 102 to the identified vehicle 100 or heavy equipment 100. In some embodiments, this is done using the beacon's unique identification number (UUID), or by scanning a QR code attached to the beacon 102. In certain embodiments, the mobile application records a time and location for the beacon 102 installation.

When assigning the one or more Bluetooth beacons 102 to the identified vehicle 100 or heavy equipment 100, the system user or driver/operator 104 establishes communication between the mobile application and one of the beacons, and specifies the location of the beacon 102 on the vehicle 100 or heavy equipment 100. For example, on a vehicle 100, the driver/operator 104 would approach each beacon 102 separately, establish communication, and designate the beacons 102 as being located at driver-side front, driver-side back, passenger-side front, and passenger-side back. In certain embodiments, the electronic mobile device 106 would record the RSSI dB levels of each beacon 102 as its information is added and stored in the mobile application.

In operation, as the system user or driver/operator 104 walks around the vehicle/equipment 100, the electronic apparatus 102 that is installed in the vehicle/equipment 100 will recognize the location of the mobile electronic device 106 in the driver/operator's possession the entire time the operator 104 walks around the vehicle/equipment 100 performing their inspection. The mobile electronic device 106 could be one of a smart phone, tablet computer, and a laptop computer.

In typical embodiments, a downloadable software-based mobile application is stored on the mobile electronic device 106. The software-based mobile application is programmed to communicate with the electronic apparatus 102 in such a way that allows the mobile application to determine and record the location of the system user or driver/operator 104 relative to the electronic apparatus 102. In certain embodiments, the electronic apparatus 102 is configured to detect movement in the 360 degrees surrounding the vehicle or equipment 100.

During an exemplary vehicle/equipment 1X) inspection, the driver/operator 104 activates the aforementioned mobile application on the mobile electronic device 106 and selects "Begin Inspection". The driver/operator 104 then reviews a list of nearby vehicles/equipment 100 shown on the mobile application and select the vehicle/equipment 100 to be inspected. The mobile application will search for signals from the one or more Bluetooth beacons 102 installed on the vehicle or equipment 100 and use the signals to determine a location of the driver/operator 104. In particular embodiments, the driver/operator 104 would be prompted by the mobile application to begin the walk around inspection carrying the mobile electronic device 106. The mobile application would determine the driver/operator's location by the relative RSSI levels. The RSSI levels must be within the calculated values for each beacon location.

In particular embodiments of the invention, the one or more Bluetooth beacons 102 and mobile application are configured to determine an Angle of Arrival (AoA) and Angle of Departure (AoD) for the driver/operator 104 or system user in order to verify that the driver/operator 104 properly completed inspection of the vehicle or equipment 100. Such a determination may include, depending on the application, multiple transmitters and receivers configured to provide AoA and AoD data. In certain embodiments, there is a fixed antenna array attached to a centralized location of the vehicle or piece of equipment 100. In this case, the antenna array is configure to triangulate the location of the mobile electronic device 106 being carried by the driver/operator 104.

In another embodiment, multiple antennas are included in the electronic apparatus 102 and/or mobile electronic device 106 to provide the location details for the driver/operator 104 in correlation to the vehicle/equipment 100. In a further embodiment of the invention, the electronic apparatus 102 stores the data generated by each inspection and automatically generates an electronic record or printed documentary record of the inspection.

An inspection checklist customized to the type of vehicle in use will be offered to the client as well. This inspection checklist will be included in the mobile application and filled out by the operator. The inspection will not be considered complete until the operator has done a complete walk around of the vehicle/equipment and the checklist has been completed.

Results of the completed inspection(s) will be saved in a vehicle/equipment inspection database and available for review by the system user. In certain embodiments of the invention, if the drive/operator 104 fails to complete the inspection, the system will issue an alert their supervisor will be notified.

Figure 3:
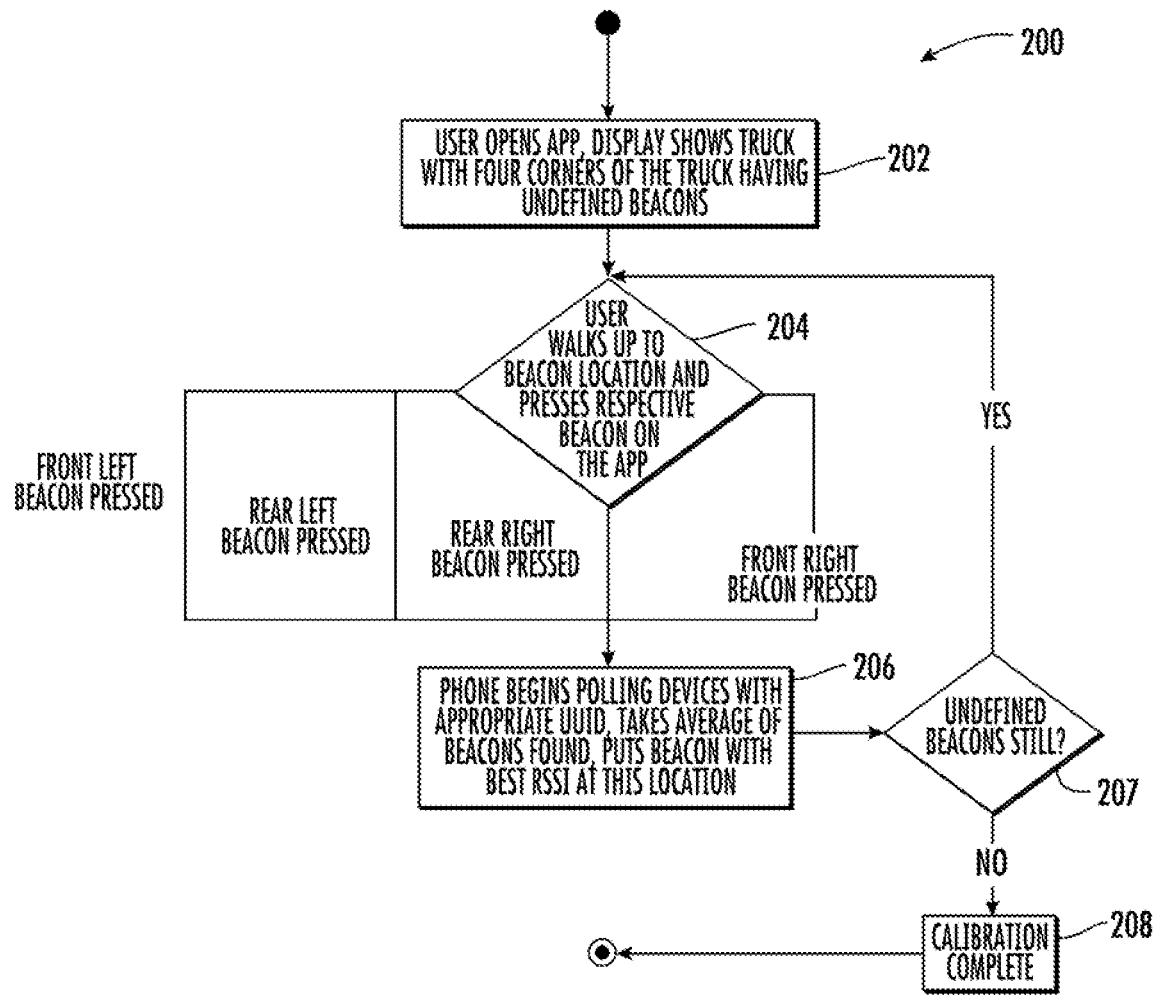
FIG. 3 is a flowchart showing a process for calibration of the vehicle/equipment inspection tracking system in accordance with an embodiment of the invention.
Figure 4:
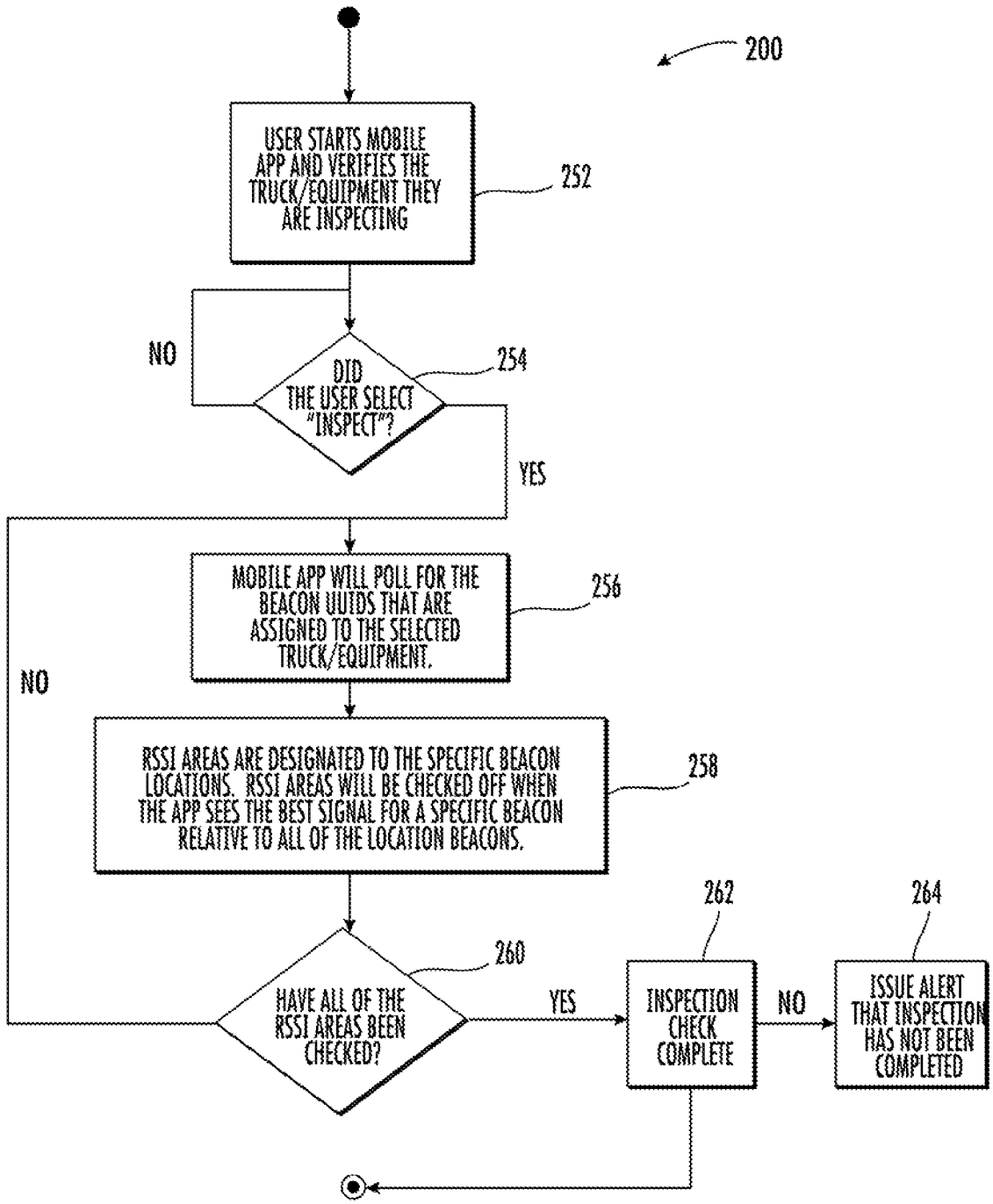
FIG. 4 is a flowchart showing a process for inspection of a vehicle or piece of equipment using the vehicle/equipment inspection tracking system in accordance with an embodiment of the invention.

FIG. 3 is a flowchart showing an exemplary process for calibration 200 of the vehicle/equipment inspection system of FIG. 1, and FIG. 4 is a flowchart showing an exemplary process for inspection 250 of a vehicle/equipment 100 using the vehicle/equipment inspection system of FIG. 1. FIG. 3 discloses the process for calibration 200 of the vehicle/equipment inspection system following installation of the beacons 102.

In the first step of calibration process 200, the driver/operator 104 accesses the mobile application 202 which, in some embodiments, results in the display on the mobile electronic device 106 of the vehicle/equipment 100 and the associated Bluetooth beacons 102 to be calibrated. For each electronic or Bluetooth beacon 102 shown on the display of the mobile electronic device 106, the driver/operator 104 approaches the beacon 102 and selects 204 the corresponding beacon 102 on the display. The mobile application then begins polling 206 (establishing wireless communication with) each of the electronic beacons 102 on the vehicle/equipment 100, averages the RSSI for each beacon 102, and based on the relative RSSI of the beacons 102, identifies the beacon 102 nearest the driver/operator 104. Once the driver/operator 104 has repeated this step 207 for each beacon 102 on the vehicle/equipment 100, the calibration is completed 208.

FIG. 4 discloses the process for inspection 250 of a vehicle/equipment 100 using the aforementioned vehicle/equipment inspection system including the aforementioned mobile application. In the first step of calibration process 250, the driver/operator 104 accesses the mobile application 252 to select the vehicle/equipment 100 to be inspected. The driver/operator 104 the selects "inspect" 254 in the mobile application. This causes the mobile electronic device 106 to poll 256, or establish wireless communication with, each of the electronic or Bluetooth beacons 102 that are assigned to the vehicle/equipment 100. The mobile application then checks the RSSI areas 258 assigned to each designated beacon 102 for a maximum RSSI to determine movement of the driver/operator 104 around the vehicle/equipment 100.

This process is repeated 260 until the maximum RSSI for all beacons 102 has been acquired, and as a result the inspection is completed 262. In a particular embodiment, if the inspection is not completed and the mobile application is closed, the system automatically issues an alert that the inspection was not completed. Such an alert may be used to prompt the supervisor to instruct the driver/operator 104 to complete the inspection.

All references, including publications, patent applications, and patents cited herein are hereby incorporated by reference to the same extent as if each reference were individually and specifically indicated to be incorporated by reference and were set forth in its entirely herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A vehicle and equipment inspection system for a machine comprising:
   one or more electronic apparatus, each attached to the vehicle or equipment, and each electronic apparatus adapted for wireless communication;
   a mobile electronic device adapted for wireless communication with the electronic apparatus, the mobile electronic device including a mobile application configured to determine a location of the mobile electronic device relative to each of the one or more electronic apparatus;
   wherein the one or more electronic apparatus are each configured to detect movement of the mobile electronic device in a 360-degree-space surrounding the vehicle or equipment.

2. The vehicle and equipment inspection system of claim 1, wherein the mobile electronic device is one of a smart phone, smart watch, tablet computer, and a laptop computer.

3. A vehicle and equipment inspection system for a machine comprising:
   one or more electronic apparatus, each attached to the vehicle or equipment, and each electronic apparatus adapted for wireless communication;
   a mobile electronic device adapted for wireless communication with the electronic apparatus, the mobile electronic device including a mobile application configured to determine a location of the mobile electronic device relative to each of the one or more electronic apparatus;
   wherein the one or more electronic apparatus and mobile application are configured to determine an angle of arrival or angle of departure for a user carrying the mobile electronic device.

4. The vehicle and equipment inspection system of claim 3, wherein the mobile application is configured to determine if the user inspected the vehicle or equipment based on the determined angle of arrival or angle of departure.

5. The vehicle and equipment inspection system of claim 1, wherein the electronic apparatus includes one or more antennas used to determine a location of the user.

6. The vehicle and equipment inspection system of claim 1, wherein the mobile electronic device includes one or more antennas used to determine a location of the user.

7. The vehicle and equipment inspection system of claim 1, wherein the mobile electronic device and mobile application are configured to record and store data showing the location of the mobile electronic device relative to each of the one or more electronic apparatus.

8. A vehicle and equipment inspection system for a machine comprising:
   one or more electronic apparatus, each attached to the vehicle or equipment, and each electronic apparatus adapted for wireless communication;
   a mobile electronic device adapted for wireless communication with the electronic apparatus, the mobile electronic device including a mobile application configured to determine a location of the mobile electronic device relative to each of the one or more electronic apparatus;
   wherein the mobile electronic device and mobile application are configured to determine the relative RSSI levels of the one or more electronic apparatus in order to determine a location of the mobile electronic device.

9. The vehicle and equipment inspection system of claim 1, wherein the electronic apparatus is configured to communicate wirelessly using one of the Bluetooth, LTE, RF, Z-Wave, Wi-Fi, and Zigbee communication protocols.

10. The vehicle and equipment inspection system of claim 1, wherein the electronic apparatus is hardwired to the power supply of the vehicle or equipment.

11. The vehicle and equipment inspection system of claim 1, wherein the electronic apparatus is battery-powered.

12. The vehicle and equipment inspection system of claim 1, wherein the electronic apparatus includes a QR code or a unique identification number to identify the electronic apparatus in the mobile application.

13. A method of vehicle or equipment inspection comprising the steps of:
   installing one or more electronic beacons on a vehicle or piece of equipment;
   providing a mobile electronic device with a mobile application configured for wireless communication with each of the one or more electronic beacons;
   using the mobile application to select the vehicle or piece of equipment to be inspected;
   wirelessly communicating with the one or more electronic beacons associated with the vehicle or piece of equipment; and
   determining an RSSI level for each of the one or more electronic beacons and then determining a location of a user carrying the mobile electronic device based on the determined RSSI levels.

14. The method of claim 13, further comprising using the one or more electronic beacons to detect movement of the mobile electronic device in a 360-degree-space surrounding the vehicle or equipment.

15. The method of claim 13, wherein providing a mobile electronic device comprises providing one of a smart phone, smart watch, tablet computer, and a laptop computer.

16. The method of claim 13, further comprising using the one or more electronic beacons and the mobile application to determine an angle of arrival or angle of departure for a user carrying the mobile electronic device.

17. The method of claim 13, further comprising using the mobile application to store, on the mobile electronic device, location data for the mobile electronic device relative to each of the one or more electronic beacons.

18. The method of claim 13, further comprising scanning a QR code on one of the one or more electronic beacons to identify that electronic beacon in the mobile application.

19. The method of claim 13, further comprising entering a unique identification number or string on one of the one or more electronic beacons to identify that electronic beacon in the mobile application.

20. The method of claim 13, wherein determining an RSSI level for each of the one or more electronic beacons comprises a user carrying the mobile electronic device to approach each of the one or more beacons to obtain a maximum RSSI level for each of the one or more electronic beacons.

* * * * *